US008662281B2

(12) United States Patent
Bernard et al.

(10) Patent No.: US 8,662,281 B2

(45) Date of Patent: Mar. 4, 2014

(54) DEVICE FOR STORING MAILPIECES ON EDGE

(75) Inventors: Emmanuel Bernard, Sannois (FR); Stéphane Le Gallo, Savigy sur Orge (FR)

(73) Assignee: Neopost Technologies, Bagneux (FR)

( * ) Notice: Subject to any disclaimer, the term of this patent is extended or adjusted under 35 U.S.C. 154(b) by 123 days.

(21) Appl. No.: 13/334,581

(22) Filed: Dec. 22, 2011

(65) Prior Publication Data

US 2012/0193189 A1 Aug. 2, 2012

(30) Foreign Application Priority Data

Jan. 28, 2011 (EP) .................................... 11305092

(51) Int. Cl.
*B65G 1/00* (2006.01)

(52) U.S. Cl.
USPC ...................... 198/347.1; 271/220; 414/791.5

(58) Field of Classification Search
USPC .............. 198/347.1; 414/788.9, 791.5; 271/2, 271/216, 220
See application file for complete search history.

(56) References Cited

U.S. PATENT DOCUMENTS

| | | | | | |
|---|---|---|---|---|---|
| 1,581,583 | A | | 4/1926 | Low | |
| 2,392,746 | A | * | 1/1946 | Labombarde | 271/185 |
| 3,945,635 | A | | 3/1976 | Marin | |
| 4,240,539 | A | * | 12/1980 | Klapp | 198/462.2 |
| 5,464,317 | A | * | 11/1995 | Foster et al. | 414/798.2 |
| 5,615,995 | A | | 4/1997 | Nobile et al. | |
| 5,961,114 | A | * | 10/1999 | Barker et al. | 271/184 |
| 6,022,018 | A | * | 2/2000 | Zimmermann et al. | 271/220 |
| 6,250,629 | B1 | * | 6/2001 | Brown et al. | 271/220 |
| 6,817,608 | B2 | * | 11/2004 | Sloan et al. | 271/216 |
| 8,256,765 | B2 | * | 9/2012 | Desire | 271/216 |
| 8,398,076 | B2 | * | 3/2013 | Bernard et al. | 271/216 |
| 2003/0015835 | A1 | * | 1/2003 | Post et al. | 271/149 |
| 2003/0189283 | A1 | | 10/2003 | Sloan, Jr. et al. | |
| 2010/0258406 | A1 | | 10/2010 | Desire | |

FOREIGN PATENT DOCUMENTS

GB 2187718 A 9/1987

* cited by examiner

*Primary Examiner* — James R Bidwell
(74) *Attorney, Agent, or Firm* — Sughrue Mion, PLLC

(57) ABSTRACT

Provided is a storage device for a mail-handling machine. The storage device includes a mailpiece-receiving deck along a longitudinal edge of which a referencing wall extends, and through which a conveyor belt passes for the purpose of conveying mailpieces along the referencing wall from an inlet of the device towards a sloping surface against which the mailpieces accumulate, and a skid-forming part that is supported by a structure secured to the storage device and that comes to press against said stack of mailpieces substantially over the entire length of said stack, so as to jog the top of the stack.

7 Claims, 3 Drawing Sheets

DEVICE FOR STORING MAILPIECES ON EDGE

FIELD OF THE INVENTION

The present invention relates to the field of mail handling and it relates more particularly to a storage device for a mail-handling machine.

PRIOR ART

Current mail-handling machines are increasingly fast, and such high franking rates require their feed and storage capacities to be increased in order to avoid the operator constantly needing to load and unload the machine. However, this increase in the feed and storage capacity must not be achieved to the detriment of the amount of space that needs to be dedicated to the franking machine or "postage meter".

Although this problem can be solved simply for feed devices in which the mailpieces are disposed on edge in a stack and in which an increase in the height of the stack does not give rise to any change in the footprint of the module, i.e. in the floor area it occupies, it is much more difficult to solve for storage devices (or stackers) in which such mailpieces are, in conventional manner, stored horizontally, and in which an increase in the number of mailpieces stored in this way requires an increase in the area used for such storage.

Thus in many storage devices, the conveyor belt onto which the mailpieces ejected from the mail-handling machine come to rest one-by-one, directs those mailpieces towards a sloping surface in order to stand them up, thereby increasing the storage capacity of the device (see above Patents GB 2 187 718 and U.S. Pat. No. 5,615,995).

Unfortunately, that storage-by-accumulation solution is not fully satisfactory because, although it operates properly for the first mailpieces, it does not operate properly after a certain number of mailpieces because, while the conveyor belt continues to push the bottom portion of the stack against the sloping surface, the top portion is no longer affected by that thrust. As a result, the stack becomes trapezoidal with a small width at its base and a large width at its top that eventually causes the stack to fall onto the conveyor belt, thereby causing the device to jam.

However, Patent US 2010/258406 discloses a storage device having a pivot arm that is mounted to move both vertically about a hinge pin and horizontally along a slide rail, on which arm firstly a friction roller is mounted for pressing said mailpieces against said conveyor belt, and secondly a holding roller is mounted for pressing the mailpieces against the sloping surface. Unfortunately, although that device makes it possible to prevent the stack from tipping over, the resulting stack is not completely uniform, and therefore does not make it possible to take full advantage of the horizontal storage capacity offered by the device.

OBJECT AND SUMMARY OF THE INVENTION

The present invention proposes to mitigate the above-mentioned drawbacks by providing a storage device for a mail-handling machine, said storage device comprising a mailpiece-receiving deck along a longitudinal edge of which a referencing wall extends, and through which a conveyor belt passes for the purpose of conveying mailpieces along said referencing wall from an inlet of the device towards a sloping surface against which said mailpieces accumulate, said storage device further comprising a skid-forming part that is supported by a structure secured to said storage device and that comes to press against said stack of mailpieces substantially over the entire length of said stack, so as to jog the top of said stack of mailpieces.

Thus, by pressing the stack and by preventing it from exceeding a predetermined height level throughout the storage process, it becomes possible to accumulate a larger number of mailpieces for the same length of device.

Preferably, said skid-forming part is connected to said structure in deployable/retractable manner via at least one hinged support arm defining at least two distinct height positions relative to said mailpiece-receiving deck.

Advantageously, when the mailpieces are fed in in-line along said referencing wall, said two positions are set respectively at 110 mm and at 180 mm from said mailpiece-receiving deck, and, when the mailpieces are fed in at 90° relative to said referencing wall, said two positions are set respectively at 75 mm and at 145 mm from said mailpiece-receiving deck.

In a preferred embodiment, the device has two support arms hinged against two axial springs firstly to said structure via first pivot pins and secondly to said skid-forming part via second pivot pins, said support arms thus forming with said structure and with said skid-forming part a parallelogram linkage. Advantageously, said structure is fastened securely to said slide rail.

In order to enable said skid-forming part to move between said two positions, each of said support arms may be provided with a flat designed to co-operate with a trigger acting against a return spring. Preferably, said triggers are actuated simultaneously from a single push button to which they are connected.

BRIEF DESCRIPTION OF THE DRAWINGS

Other characteristics and advantages of the present invention appear more clearly from the following description given by way of non-limiting indication and with reference to the accompanying drawings, in which.

DESCRIPTION OF AN EMBODIMENT

Figure 1:
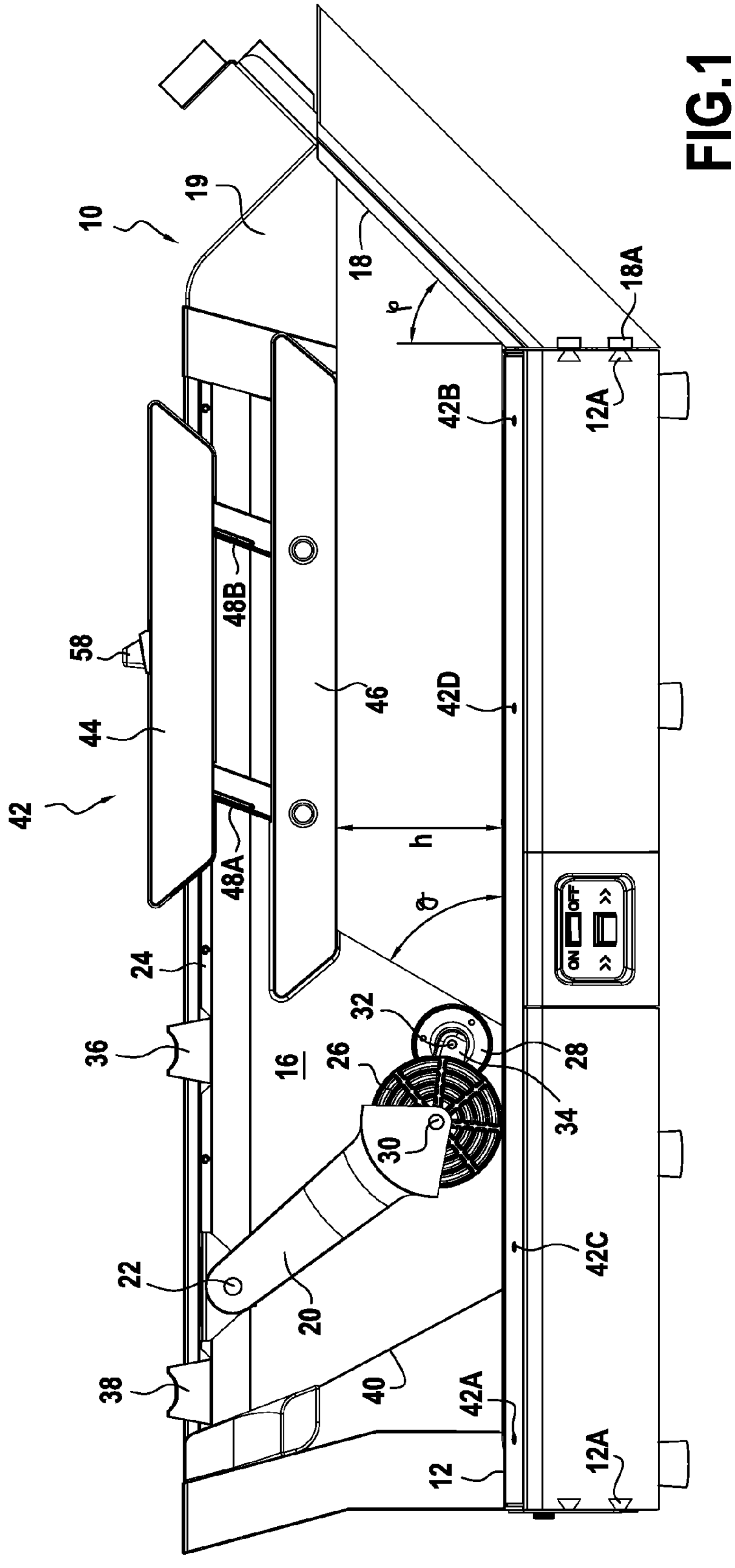
FIG. 1 is a view facing the operator and showing the storage device of the invention, the envelopes being fed in from the left side.

FIG. 1 shows a storage device 10 that, in conventional manner, includes a rectangular mailpiece-receiving deck 12 through which a conveyor belt 14 passes (see FIGS. 2A and 3B) that extends over the entire length of the deck along a longitudinal referencing wall 16, the end of the deck that is opposite from its end at the inlet of the device being formed by a sloping surface 18. The angle $\phi$ formed by the sloping surface and the mailpiece-receiving deck is preferably about 45° plus or minus 10°. Continuity between the longitudinal wall and the sloping surface is provided by a link plate 19. It should be noted that, in order to facilitate laterally jogging the mailpieces, the mailpiece-receiving deck and the referencing wall that form an angle of 90° between them are advantageously inclined backwards (i.e. going away from the operator) by a few degrees relative to the horizontal.

In the embodiment shown, the device may also include a pivot arm 20 that is mounted to move both vertically about a hinge pin 22 fastened in a manner such that it extends perpendicularly to the referencing wall, and also horizontally along a slide rail 24 fastened to the referencing wall, and on which pivot arm a set of friction rollers 26 and advantageously a holding roller 28 are mounted (this addition of a pivot arm not being essential to operation of the invention, even though it optimizes the performances of the invention). In order to enable the device to be used in all of the feed and accumulation configurations, the sloping surface 18 and the link plate can be removed and placed at the other end of the device, the pivot arm then itself being turned over about its hinge pin 22. For this purpose, both of the ends of the deck 12 are advantageously provided with grooves 12A designed to co-operate with one or more runners 18A of the sloping surface. Similar or other fastening means are naturally provided on the link plate 19.

Each friction roller 26 is mounted idle about a first rotation pin 30 mounted at a free end of said arm and disposed perpendicularly to the direction in which the mailpieces move. By pressing the mailpieces against the conveyor belt, it makes it possible to increase the coefficient of friction between the mailpieces and said belt. The width of the set of friction rollers is at least equal to the width of the conveyor belt.

The holding roller 28 is mounted idle about a second rotation pin 32 that is perpendicular to the direction in which the mailpieces move and that is mounted at the free end of a secondary arm 34 that is advantageously hinged about the pin 30 and that extends forwards from the pivot arm 20, i.e. towards the sloping surface. By compressing the stack against the sloping surface 18, it makes it possible to increase the storage capacity of said stack. In addition, for mailpieces of large thickness, it makes it possible to arch said mailpieces and thus to facilitate incorporating them into the stack. The hinging about the rotation pin 30 also makes it possible to turn the roller over for when the mailpieces accumulate in the other direction or at 90°.

The horizontal movement of the pivot arm takes place between two abutments, namely a front abutment 36 and a rear abutment 38 (the concepts of front and rear being defined relative to the direction in which the mailpieces advance through the device), which abutments are advantageously movable along the slide rail 24, independently of each other like sliders so as to define the maximum stroke for the pivot arm. Thus, when the device is processing mailpieces that are of large thickness and that are therefore inflexible, the front abutment 36 is moved back to enable the mailpieces to accumulate better. The abutment 38 has the same function when the sloping surface 18 changes ends and is fastened to the opposite end.

In accordance with the invention, in order to jog the top of the stack of mailpieces, the device further includes a mechanism 42 having a structure 44 secured to the device (advantageously fastened to the slide rail 24) and supporting, e.g. by means of two hinged support arms 48A, 48B (coupling by means of a single arm is naturally also possible), a deployable/retractable skid-forming part 46 that comes to press on the top of the stack of mailpieces, substantially over the entire length of said stack. The two support arms are hinged against two axial springs 50A, 50B firstly to the structure via first pivot pins 44A, 44B and secondly to the skid-forming part via second pivot pins 46A, 46B, the resulting assembly thus forming a parallelogram linkage.

Figure 2B:
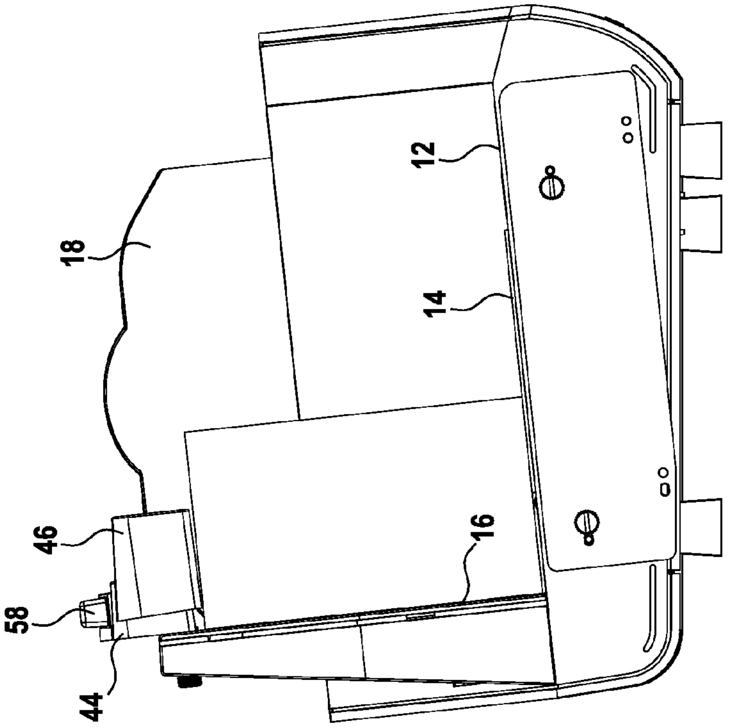
FIGS. 2A and 2B are fragmentary views of the end of the device of FIG. 1 in two distinct positions, namely a high position and a low position.
Figure 2A:
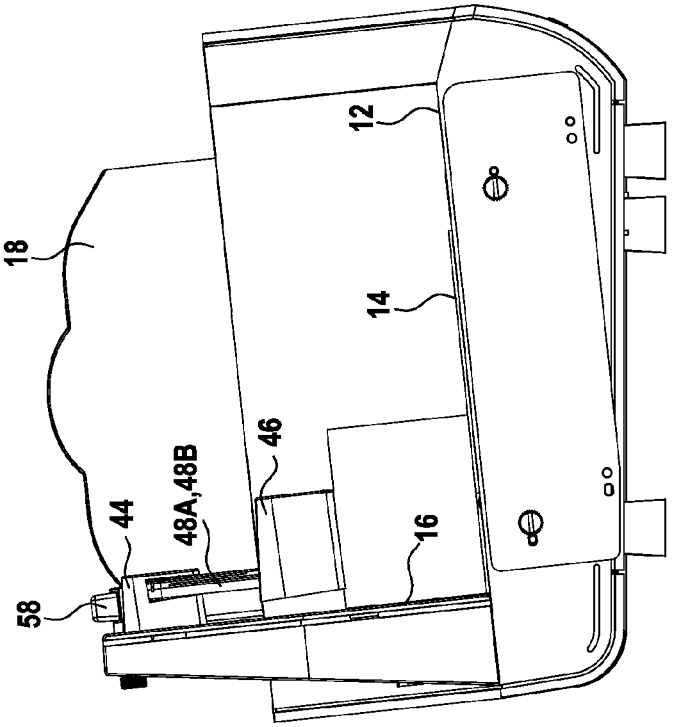

In the example shown, the skid-forming part may take up two distinct positions depending on the format of said mailpieces, namely a low position, as shown in FIG. 1 and in FIG. 2A, and a high position into which said part rises until it comes to the same level as the structure, as shown in FIG. 2B. The low position defines a height under the skid of 110 mm enabling mailpieces of postcard or business card format to be held, while the high position at 180 mm enables the other types of mailpieces (e.g. C6/5 and #10) of larger formats to be held. In each of these two positions, the height h is defined in a manner such that the mailpieces held in this way form an angle θ of about 60° plus or minus 10° with the mailpiece-receiving deck 12. But, naturally, other intermediate positions are possible for handling different formats, in particular depending on the country in which the storage device is operated (France, Great Britain, Germany, USA, etc.) subject to keeping the same holding angle of about 60°. The same applies when, instead of being fed in in-line along the referencing wall (with an arrival from the right or from the left), said mailpieces are fed in at 90° relative to said referencing wall. The low position then defines, under the ski, a height of 75 mm, making it possible to hold mailpieces of the following formats: postcard; business card; C6/5; and #10; while the high position at 145 mm makes it possible to hold the other types of mailpieces of larger formats.

Figure 3:
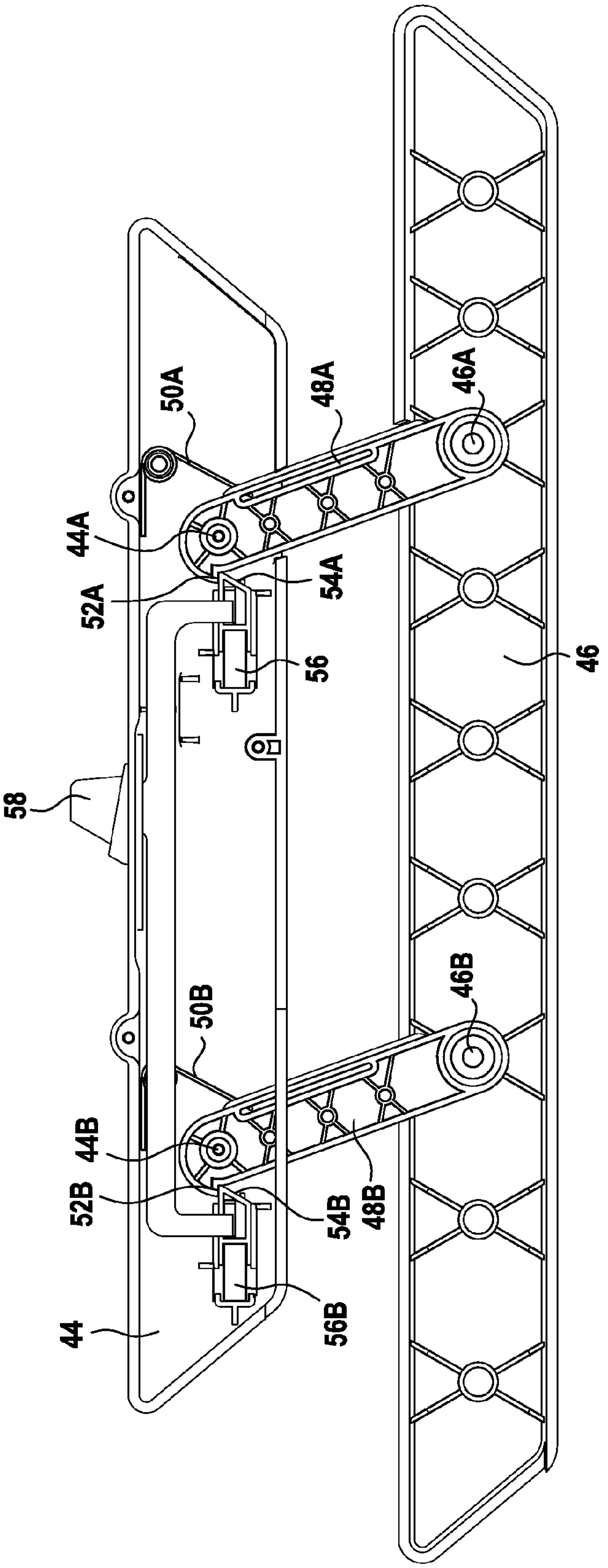
FIG. 3 is a view of a "skid" element of the device of FIG. 1, shown with the cover off.

As shown in FIG. 3, in order to enable the skid-forming part to move between these two positions, each support arm has a flat 52A, 52B substantially at its hinge at which it is hinged to the structure, which flat is designed to co-operate with a trigger 54A, 54B acting against a return spring 56A, 56B. These two triggers are actuated simultaneously from a single push-button 58 to which they are both connected.

Since the speed at which the mailpieces are conveyed through the device (which speed is proportional to the speed at which the conveyor belt moves) is, in general, less than the speed at which the mailpieces are ejected from the franking machine, a flexible flap 40 is provided above the conveyor belt and over the entire width thereof for the purpose of reducing the speed of the mailpieces arriving in the device. By hitting this speed reducer flap, the mailpieces are stopped and they fall onto the conveyor belt, and they then move with the conveyor belt.

The presence of the optical sensors 42A to 42D should be noted. Depending on the feed (or arrival) direction in which the mailpieces are fed in (or arrive) that is chosen by the operator, these optical sensors serve to detect overlapping of the mailpieces and to stop the conveyor belt moving when no actual mailpiece overlap is detected at the inlet of the device.

The device operates as follows. At rest, the skid-forming part 46 is, depending on the format of the mailpieces to be stored, either in the low position or in the high position. The pivot arm 20 is in front of the ski-forming part, substantially in the middle of the device. When a first mailpiece is ejected from the mail-handling machine onto the mailpiece-receiving deck 12 (possibly after having been in contact with the flexible flap), it is conveyed flat by the conveyor belt 14 towards the sloping surface 18 where it stands up. The process then continues with the second mailpiece and then with the following mailpieces that accumulate on one another until they come into abutment against the holding roller 28, and then, when the pivot arm 20 moves back in turn, until said rear abutment 38 is reached. Because of the presence of the holding roller, the mailpieces that have accumulated against the sloping surface remain constantly in a substantially vertical position. And, above all, the presence of the skid-forming part makes it possible to jog the top of the stack, thereby making the stack more uniform during storage. In addition, the bias exerted by the skid on the top of the stack, by increasing the grip of the mailpieces on the conveyor belt, compresses the stack and increases the storage capacity of the device, while preventing said stack from collapsing.

When it is desired for a stack of a different format to be handled, it is then very simple to go from one position to the other. It should be noted firstly that the skid-forming part 46 is lowered by pressing on it directly with the hand until the low position is reached. Once this position has been reached, said skid-forming part is locked by means of the two triggers 54A, 54B that engage the corresponding flats 52A, 52B on the support arm. In order to raise the skid-forming part to the high position, the operator then pushes the single push button 58, thereby bringing the triggers back into the rear position by compressing the return springs 56A, 56B, thereby releasing the support arms that then raise the skid-forming part under drive from the axial springs 50A, 50B that are secured to the structure of the device. Releasing the push button then brings the triggers back into their initial position.

Thus, with the invention, a storage device is obtained that is simple, that is usable in various configurations, and that enables its storage capacity to be increased significantly relative to a device of the same length.

What is claimed is:

1. A storage device for a mail-handling machine, said storage device comprising a mailpiece-receiving deck along a longitudinal edge of which a referencing wall extends, and through which a conveyor belt passes for the purpose of conveying mailpieces along said referencing wall from an inlet of the device towards a sloping surface against which said mailpieces accumulate, said storage device further comprising a skid-forming part that is supported by a structure secured to said storage device and that comes to press against said stack of mailpieces substantially over the entire length of said stack, so as to jog the top of said stack of mailpieces, said skid-forming part being connected to said structure in deployable/retractable manner via at least one hinged support arm defining at least two distinct horizontal fixed height positions relative to said mailpiece-receiving deck.

2. A storage device according to claim 1, wherein, when the mailpieces are fed in in-line along said referencing wall, said two positions are set respectively at 110 mm and at 180 mm from said mailpiece-receiving deck.

3. A storage device according to claim 1, wherein, when the mailpieces are fed in at 90° relative to said referencing wall, said two positions are set respectively at 75 mm and at 145 mm from said mailpiece-receiving deck.

4. A storage device according to claim 1, having two support arms hinged against two axial springs firstly to said structure via first pivot pins and secondly to said skid-forming part via second pivot pins, said support arms thus forming with said structure and with said skid-forming part a parallelogram linkage.

5. A storage device according to claim 4, said structure being fastened securely to said slide rail.

6. A storage device according to claim 1, wherein, in order to enable said skid-forming part to move between said two positions, each of said support arms is provided with a flat designed to co-operate with a trigger acting against a return spring.

7. A storage device according to claim 6, said triggers being actuated simultaneously from a single push button to which they are connected.

* * * * *